United States Patent
Wang (10) Patent No.: US 9,137,077 B2
(45) Date of Patent: Sep. 15, 2015

(54) HETEROGENEOUS PILOTS

(76) Inventor: Xiao-an Wang, Allentown, PA (US)

( * ) Notice: Subject to any disclaimer, the term of this patent is extended or adjusted under 35 U.S.C. 154(b) by 742 days.

(21) Appl. No.: 13/293,813

(22) Filed: Nov. 10, 2011

(65) Prior Publication Data

US 2013/0121379 A1 May 16, 2013

(51) Int. Cl.
*H04B 1/00* (2006.01)
*H04L 27/26* (2006.01)
*H04L 25/02* (2006.01)
*H04L 5/00* (2006.01)
*H04L 25/03* (2006.01)

(52) U.S. Cl.
CPC .......... *H04L 27/2613* (2013.01); *H04L 5/0048* (2013.01); *H04L 25/0204* (2013.01); *H04L 25/0224* (2013.01); *H04L 5/0016* (2013.01); *H04L 5/0023* (2013.01); *H04L 5/0035* (2013.01); *H04L 2025/03426* (2013.01)

(58) Field of Classification Search
CPC ... H04L 5/005; H04L 5/0051; H04L 25/0224; H04L 27/2613; H04L 5/0048; H04L 27/2626; H04L 2025/03426
USPC .................. 375/260, 267, 347, 149, 340, 295
See application file for complete search history.

(56) References Cited

U.S. PATENT DOCUMENTS

| 5,311,176 | A * | 5/1994 | Gurney | 341/50 |
|---|---|---|---|---|
| 7,468,943 | B2 * | 12/2008 | Gu et al. | 370/203 |
| 7,733,989 | B2 * | 6/2010 | Guey | 375/340 |
| 8,363,691 | B2 * | 1/2013 | Hasegawa et al. | 375/130 |
| 8,422,356 | B2 * | 4/2013 | Kishiyama et al. | 370/210 |
| 8,488,702 | B2 * | 7/2013 | Hasegawa | 375/267 |
| 8,537,923 | B2 * | 9/2013 | Lee et al. | 375/267 |
| 2005/0124352 | A1 * | 6/2005 | Fernandez-Corbaton et al. | 455/452.2 |
| 2008/0108310 | A1 * | 5/2008 | Tong et al. | 455/69 |
| 2008/0181341 | A1 * | 7/2008 | Okazaki | 375/346 |
| 2009/0161772 | A1 * | 6/2009 | Sawahashi et al. | 375/260 |
| 2009/0232234 | A1 * | 9/2009 | Du | 375/260 |
| 2009/0247157 | A1 * | 10/2009 | Yoon et al. | 455/434 |
| 2009/0296563 | A1 * | 12/2009 | Kishiyama et al. | 370/210 |
| 2011/0038344 | A1 * | 2/2011 | Chmiel et al. | 370/330 |
| 2012/0008663 | A1 * | 1/2012 | Schilling | 375/146 |

\* cited by examiner

*Primary Examiner* — Sophia Vlahos (57) ABSTRACT

Large-dimension MIMO and multipoint broadcasting in new generation of wireless networks create high demand for various types of pilots in transmission signals for channel estimation, data demodulation, synchronization, etc. More pilots, as in existing networks, use more resources and thus diminish the network capacity. Methods and apparatus of heterogeneous pilots are disclosed. A heterogeneous pilot has its own signal characteristics that are different from the primary information-bearing signals in the network. Heterogeneous pilots can be spread-spectrum signals in an OFDM-based wireless network. Heterogeneous pilots use no network resources, and can be as many as desired, and can be designed to have versatile utilities. Also described are methods and apparatus of heterogeneous pilot cancellation that minimizes the interference of heterogeneous pilots on the primary information-bearing signals. Applications of the described methods and apparatus include OFDM-based wireless cellular networks, such as LTE-advanced and Wireless LAN.

14 Claims, 5 Drawing Sheets

HETEROGENEOUS PILOTS

BACKGROUND

1. Field of Application

The following description relates generally to telecommunications systems and wireless communications systems.

2. Prior Art

A wireless network uses pilots or reference signals for channel estimation and data demodulation. For two communications devices communicating to each other, a pilot is a signal known to both devices. The transmit-device transmits the pilots along with the data to the receive-device. The receive-device uses the pilots in the received signal to estimate the channel. The data can then be demodulated with the knowledge of the estimated channel. The pilot can also be used for synchronization, timing and frequency tracking.

Figure 1:
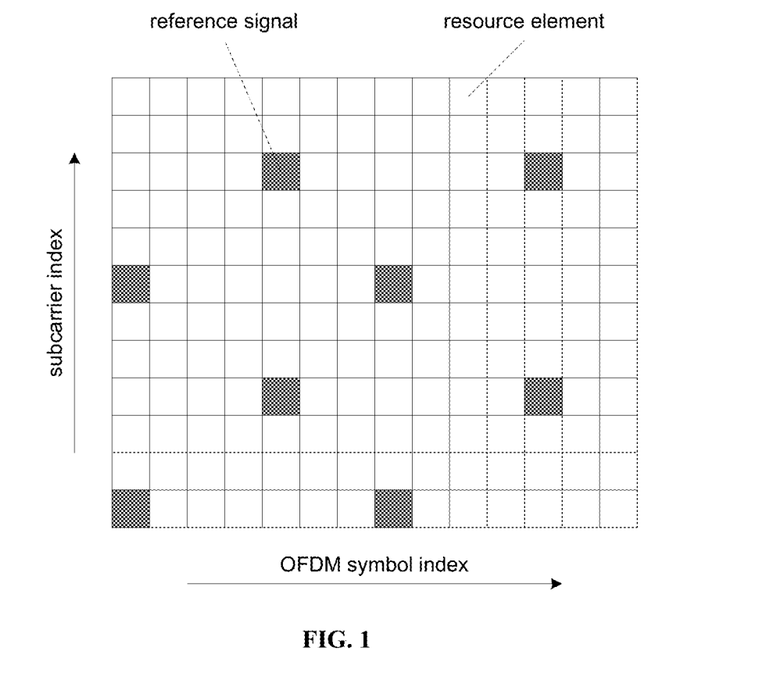
FIG. 1 illustrates an example allocation of reference signals for a single channel among the resource elements.

In LTE (long-term evolution) and LTE-advanced wireless cellular networks, which use orthogonal frequency-division multiplexing (OFDM) radio access technology (RAT), the pilots, or the reference signals as referred to in LTE, are allocated roughly uniformly over the resource elements. A resource element is one subcarrier in an OFDM symbol, and thus can be identified with the subcarrier index in frequency domain and the OFDM symbol index in time domain. FIG. 1 illustrates an example allocation of reference signals among the resource elements for a single channel.

As LTE incorporates more and more advanced features for increased data throughput, the need for more reference signals increases. For example, a 4×4 MIMO (multi-input, multi-output) will require four reference signals, and an 8×8 MIMO will require eight. With beamforming and multipoint broadcasting (or CoMP, Coordinated Multi-Point transmission, in LTE-advanced), another type of reference signal, mobile-user specific reference signal, in addition to the conventional, cell-specific reference signal, is also needed. From FIG. 1 where only one reference signal for one single channel is shown, it is apparent that as more reference signals are allocated in the reference element grid, fewer resource elements are available for useful data. It can be said that the reference signals in LTE incur the resource penalty. With the reference-signal allocation scheme in FIG. 1, it may soon reach to the point beyond which the benefits of the advanced features for increasing the data throughout no longer make up for the loss of resource elements for useful data due to the added reference signals.

Without an effective approach to providing a multitude of reference signals or pilots, the benefits of the advanced features of LTE cannot be fully realized, or may not be realized at all. Thus a strong need exists for a method, apparatus, and system that can transmit as many pilots as needed without compromising the capacity of the useful data.

SUMMARY

The following is a summary of one or more aspects in order to provide a basic understanding of such aspects. Some concepts of one or more aspects are presented in a simplified form as a prelude to the more detailed descriptions that are to be presented later.

The subject disclosure provides for efficient means for transmitting a multitude of pilots with zero resource penalty in communications networks, and in wireless cellular networks in particular. Traditionally, pilots are designed to be an integral part of the RAT of a wireless network. Examples of the RATs include orthogonal frequency-division multiple-access (OFDM) and code-division multiple access (CDMA). If the RAT is OFDM, certain OFDM subcarriers in certain OFDM symbols are assigned to carry the pilots. If the RAT is CDMA, certain code channels can be assigned to carry pilots. The pilot signals can also use dedicated time slots in CDMA, OFDM, or TDMA (time-division multiple access). In any case, a portion of the resources of the RAT has to be allocated to pilot signals in the form of subcarriers, code channels, and/or time slots.

In some aspects of the subject disclosure, a transmit-device transmits heterogeneous pilots to a receive-device. A heterogeneous pilot is a signal that has different signal structures and/or characteristics from that of the primary information-bearing signal. A heterogeneous pilot thus does not use any resources of the primary information-bearing signal.

In one or more aspects, a wireless network with OFDM-based RAT uses spread-spectrum signals for heterogeneous pilots. In one or more further aspects, the wireless network uses an orthogonal family of spread-spectrum signals to provide for a multitude of heterogeneous pilots.

In one or more other aspects, heterogeneous pilots can be made to be transmit-device specific or receive-device specific, in multi-transmit-device, multi-receive-device communications, such as distributed MIMO and CoMP.

In still more other aspects, a heterogeneous pilot can be made to be information bearing. A heterogeneous pilot carries information by selecting a pilot sequence from several sequences assigned to it.

In yet more other aspects, a receive-device performs heterogeneous pilot cancellation before the demodulation of the primary information-bearing signal. Pilot cancellation minimizes or reduces the interference of the heterogeneous pilots on the primary information-bearing signal.

Accordingly several advantages are to provide means of feasible and efficient pilot signal design, to meet the ever-increasing demand for pilots of growing diversity, to eliminate the resource penalty of the pilot signals, and to minimize the interference of the pilot signals to the signals for useful data. Still further advantages and novel features will become apparent from a study of the following description and the accompanying drawings.

DETAILED DESCRIPTION

The disclosed subject matter will now be described more fully hereinafter with reference to the accompanying drawings, in which some, but not all aspects or embodiments, are shown with like numerals referring to like elements throughout the description. Various aspects may be embodied in many different forms and should not be construed as limited to the embodiments set forth herein. Specific details are described for the purpose of providing a thorough understanding of the subject innovation. It may be evident, however, that the disclosed subject matter may be practiced without these specific details. In other instances, well-known methods, procedures, and components have not been described in detail so as not to obscure the subject innovation.

As used herein, terms "pilot", "pilot signal", and "reference signal" all refer to a signal that serves as a pilot in a communications system. For clarity, term "pilot" will be used hereinafter, except that, on occasion, term "reference signal" may also be used in the context of the LTE. Terms "transmit-device" and "receive-device" refer to two communications devices between which the communications takes place. A transmit-device transmits signals to a receive-device, and a receive-device receives signals from a transmit-device. Note that a communications device can be both a transmit-device and a receive-device. For example, in a wireless cellular network, a base station is a transmit-device in the downlink and a receive-device in the uplink, and a mobile user is a transmit-device in the uplink and a receive-device in the downlink. It should also be understood that a transmit-device may transmit to multiple receive-devices, and a receive-device may receive from multiple transmit-devices.

Figure 2:
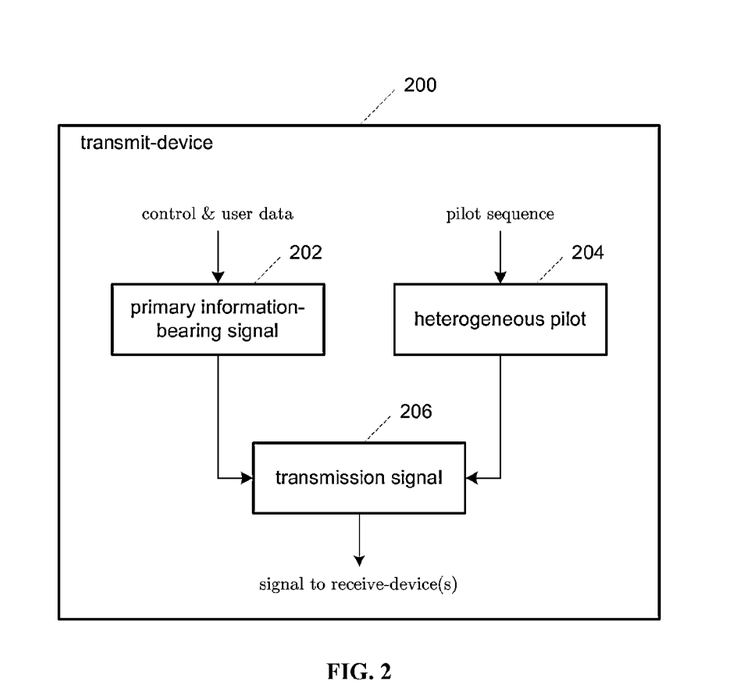
FIG. 2 illustrates an exemplary basic scheme of the heterogeneous pilot for eliminating the resource penalty of a pilot in a communications system.

FIG. 2 illustrates an exemplary basic scheme for eliminating the resource penalty of a pilot in a communications system. The pilot in FIG. 2 is referred to as the "heterogeneous pilot". A heterogeneous pilot is a signal that has different signal structures and/or characteristics from that of the primary information-bearing signal. A primary information-bearing signal carries all the relevant information, including the control and user data that the communications system is designed to carry, other than heterogeneous pilots. For example, if the communications system is an OFDM wireless network, a heterogeneous pilot can be a spread-spectrum signal. The term "spread-spectrum" used herein refers to the signal generated by transmitting a pilot sequence in time domain over a single carrier. The primary information-bearing signal in the OFDM network is then the signals carried by all the subcarriers in the OFDM network, including control data and user data, and pilots carried by the subcarriers designated for reference signals. To distinguish from heterogeneous pilots, conventional pilots, including reference signals in LTE, that share the resources of the primary information-bearing signal are referred to as "homogeneous pilots" herein, and as such, a homogeneous pilot is considered herein to be part of the primary information-bearing signal.

In FIG. 2, transmit-device 200 comprises primary information-bearing signal apparatus 202, heterogeneous pilot apparatus 204, and transmission signal apparatus 206. Primary information-bearing signal apparatus 202 generates the primary information-bearing signal carrying control and user data. Heterogeneous pilot apparatus 204 generates a heterogeneous pilot from a pilot sequence that is known to both the transmit-device and the receive-device. Transmission signal apparatus 206 combines the outputs from primary information-bearing signal apparatus 202 and heterogeneous pilot apparatus 204, to generate signals to be sent to the receive-device or receive-devices.

Many criteria can be used to construct the pilot sequence. One criterion is to require the pilot sequence to have a good auto-correlation property, i.e., the amplitudes of auto-correlation values are as low as possible, statistically and/or deterministically, except at correlation lag of zero. Pseudo-random noise (PN) sequences often exhibit the good correlation property and can be used for constructing the pilot sequence. A PN sequence can be real-valued, complex-valued, binary-valued, etc.

When more than one heterogeneous pilot is needed, as in a wireless MIMO network, a multitude of distinct pilot sequences can be used as the inputs to heterogeneous pilot apparatus 204 in FIG. 2. It may be desirable that these pilot sequences possess a good cross-correlation property, i.e., the amplitudes of cross-correlation values of any two pilot sequences should be as low as possible, statistically and/or deterministically.

It can be appreciated that a heterogeneous pilot uses no resources of the primary information-bearing signal. Consider a wireless cellular network with OFDM as the RAT, such as LTE. A heterogeneous pilot can be a different OFDM signal with different parameters such as subcarrier spacing, guard interval, etc., with the terms of the pilot sequence being carried on the subcarriers. It can also be a single-carrier type of signal such as a spread-spectrum signal. In any event, the heterogeneous pilot uses no subcarriers of the OFDM RAT. A heterogeneous pilot can occupy the same bandwidth assigned to the network, or it may use a portion of the bandwidth, with the rest portion of the bandwidth supplemented by one or more homogeneous pilots, i.e., subcarriers assigned to reference signals. A heterogeneous pilot can also spectrally overlap with a homogeneous pilot. In time domain, a heterogeneous pilot can be also made to be in sync with or asynchronous to the timing structures of OFDM symbols. For example, a heterogeneous pilot may have the same symbol interval and guard intervals as the OFDM RAT. It may also be made to be continuous. Yet another possibility is that the heterogeneous pilot has its own timing structure that is different from and/or asynchronous to that of the OFDM RAT signals.

If the signal format for a heterogeneous is spread-spectrum, the pilot sequence of the spread-spectrum heterogeneous pilot can then be referred to as the "scrambling sequence", borrowing the term from the terminology of the CDMA-based network. A scrambling sequence can be constructed from PN sequences. When more than one heterogeneous pilot is needed, as in the case of a transmit-device having more than one antenna, more than one scrambling sequence can be used, each scrambling sequence being associated with one heterogeneous pilot. Alternatively, a family of orthogonal sequences can be used, from which the pilot sequences are chosen. One example of an orthogonal sequence family is the scrambling/spreading sequence family used in a CDMA network, each scrambling/spreading sequence in the family representing a code channel. The cross-correlation value of any two scrambling/spreading sequences in the same family with the accumulation length being the same as the spreading factor is always zero. A family of scrambling/spreading sequences with variable spreading factors (also called orthogonal variable spreading factor codes, OVSF codes) can also be used. The need for multiple heterogeneous pilots can be met by a family of the scrambling/spreading sequences with a sufficiently large spreading factor and thus sufficient number of scrambling/spreading sequences, each pilot sequence being a scrambling/spreading sequence from the family.

When a receive-device receives a spread-spectrum heterogeneous pilot with a known sequence, it can estimate the corresponding channel by correlating the received signal at the receiver with the known pilot sequence. A wealth of well-known algorithms is available for channel estimation from a transmitted known pilot sequence. The estimated channel can be expressed either in time domain or in frequency domain. For an OFDM-based network, it is the channel responses at the subcarrier frequencies that are needed for data demodulation, which can be readily obtained from the frequency-domain representation of the estimated channel.

According to some aspects, two types of heterogeneous pilots may be needed when communications take place between a set of transmit-devices (transmit-set) and a set of receive-devices (receive-set), as in distributed MIMO and CoMP. The two types of heterogeneous pilots are (1) transmit-device-specific heterogeneous pilots, and (2) receive-device-specific heterogeneous pilots.

A transmit-device-specific heterogeneous pilot uses a pilot sequence that is transmit-device specific. The pilot sequences of two transmit-device-specific heterogeneous pilots from two transmit-devices are different. The pilot sequences of two receive-device-specific heterogeneous pilots from two transmit-devices are also different. If spread-spectrum heterogeneous pilots are used, for example, those pilot sequences can be different scrambling sequences, or from different families of scrambling/spreading sequences, or from different subsets of scrambling/spreading sequences of the same family.

A receive-device-specific heterogeneous pilot may be "precoded" prior to transmission. Precoding is a well-known operation in MIMO and CoMP, and is generally applied to both the primary information-bearing signal and the receive-device-specific heterogeneous pilots. Due to their differences in signal characteristics, however, the receive-device-specific heterogeneous pilots and the primary information-bearing signal may have different precoding implementations. For example, in an OFDM-based network such LTE, precoding of the primary information-bearing signals is generally done by matrix multiplications at each subcarrier in frequency domain. On the other hand, precoding of the heterogeneous pilot can be done by time-domain matrix filtering, or by frequency-domain matrix multiplications at the frequencies that may or may not coincide with subcarrier frequencies.

Figure 3:
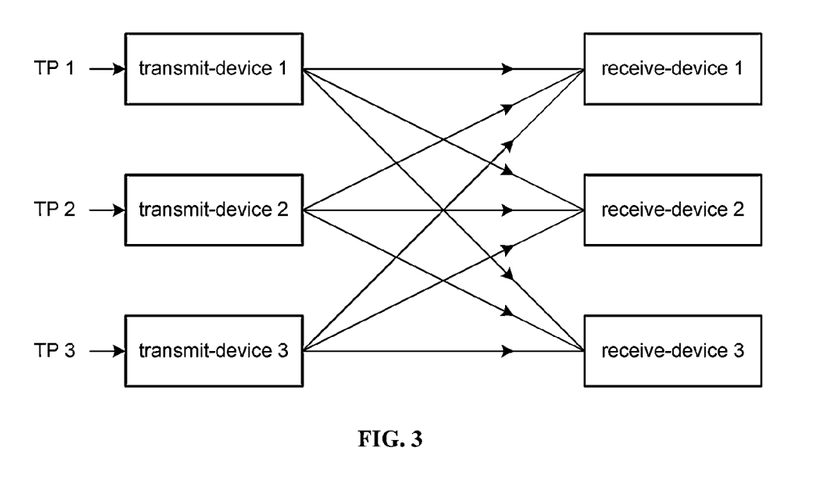
FIG. 3 illustrates an example transmission of transmit-device-specific heterogeneous pilots in an example network.

FIG. 3 illustrates an example transmission of transmit-device-specific heterogeneous pilots in an example network. In the network shown in FIG. 3, there are three transmit-devices: transmit-device 1, transmit-device 2, and transmit-device 3, and three receive-devices: receive-device 1, receive-device 2, and receive-device 3. Three pilot sequences, TP 1, TP 2, and TP 3, are assigned to three transmit-devices, with pilot sequence TP j being assigned to transmit-device j. The heterogeneous pilots that the transmit-devices generate are then transmit-device specific. Each transmit-device transmits its heterogeneous pilot that can be received by three receive-devices.

Figure 4:
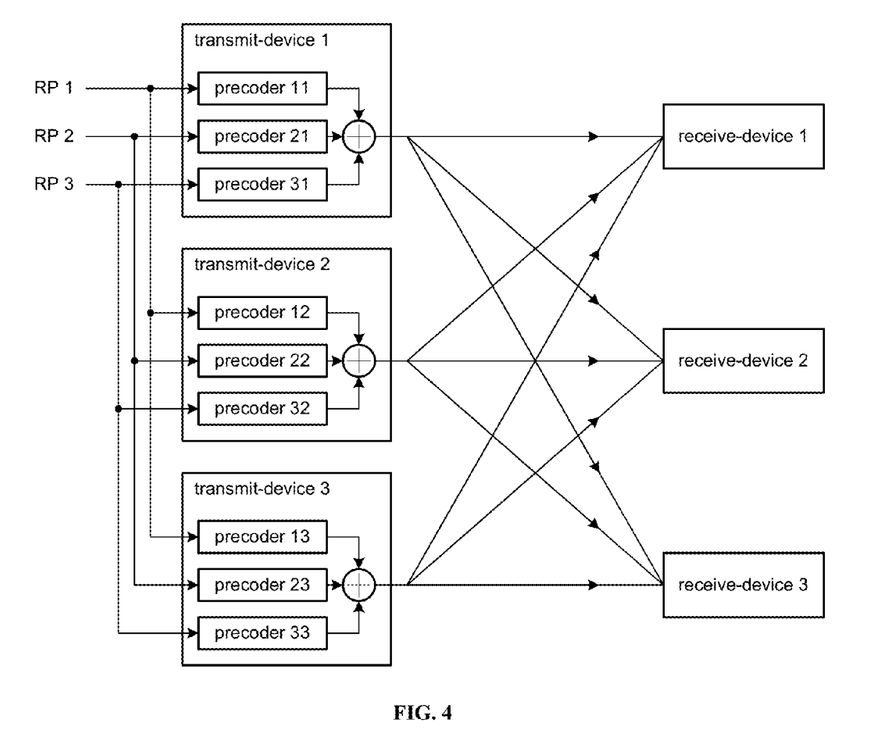
FIG. 4 illustrates an example transmission of receive-device-specific heterogeneous pilots in an example network.

FIG. 4 illustrates an example transmission of receive-device-specific heterogeneous pilots in an example network. The network shown in FIG. 4 is the same as that in FIG. 3. Three pilot sequences, RP 1, RP 2, and RP 3, are assigned to three receive-devices, with pilot sequence RP i being assigned to receive-device i. Each transmit-device in the network has all three receive-device specific pilot sequences, RP 1, RP 2, and RP 3, as inputs. Each transmit-device also comprises three precoders: i.e., precoders 11, 21, and 31 in transmit-device 1, precoders 12, 22, and 32 in transmit-device 2, and precoders 13, 23, and 33 in transmit-device 3, following the notion that precoder ij generates and precodes the heterogeneous pilot for receive-device i at transmit-device j. It should be noted that precoder ij corresponds to an element of the precoding matrix multiplier or filter, and for the example network in FIG. 4, the dimension of the matrix is 3×3. After precoding, each transmit-device combines the precoded receive-device-specific heterogeneous pilots and transmits the combined heterogeneous pilots, along with the primary information-bearing signal, to receive-devices.

In the example network in FIG. 3 and FIG. 4, each transmit-device has only one transmit-device-specific heterogeneous pilot, and each receive-device has only one assigned pilot sequence for generating the corresponding receive-device-specific heterogeneous pilot. It should be understood that the scope of the subject disclosure is not limited as such. It should also be noted that in FIG. 3 and FIG. 4, primary information-bearing signals are not included for clarity.

In an LTE-advanced network with CoMP, a transmit-device-specific heterogeneous pilot corresponds to a cell-specific heterogeneous pilot, and a receive-device-specific heterogeneous pilot corresponds to a UE-specific heterogeneous pilot, where UE stands for user equipment, a term used in LTE for mobile user.

According to some other aspects, a heterogeneous pilot can be made to carry some information, i.e., a heterogeneous pilot can be information-bearing too. This is described by way of example as follows. Instead of assigning one pilot sequence to a heterogeneous pilot, two pilot sequences can be assigned to the heterogeneous pilot. At the transmit-device, one of the two pilot sequences is chosen to generate the heterogeneous pilot based on certain information content that is related to system configuration and control and that needs to be conveyed to the receive-device without using resources in the primary information-bearing signal. For example, in a wireless network with transmit diversity as a configurable parameter, the information on transmit diversity can be conveyed to the receive-device according to the following scheme: use the first pilot sequence if transmit diversity is employed in transmission, and use the second pilot sequence if there is no transmit diversity in transmission. At the receive-device, hypothesis testing is performed first to determine which one of the pilot sequences is transmitted in the heterogeneous pilot, followed by channel estimation with the heterogeneous pilot with the detected pilot sequence. In so doing the receive-device completes the channel estimation and, at the same time, obtains some key system configuration information that may dictate how other tasks, such as demodulation and decoding, should be performed.

The two pilot sequences in the above example can be independently constructed, or, one pilot sequence can be used as a "base" pilot sequence, and the second pilot sequence can be derived from the base pilot sequence. For example, if the base pilot sequence is binary, the second pilot sequence can be obtained by logic OR operation between the base pilot sequence and the "alternating" sequence 01010101 . . . , i.e., the second pilot sequence can be obtained by flipping every other bit in the base pilot sequence.

It can be appreciated that number of pilot sequences assigned to a heterogeneous is not limited to two as in the above example. Any number of pilot sequences can be assigned to a heterogeneous pilot for the purpose of carrying certain information. It can also be appreciated that a piece of information can be carried by more than one heterogeneous pilot. For example, two heterogeneous pilots, each of which is assigned to two pilot sequences, can jointly carry an information content of two bits.

Additionally, it can be appreciated that the information carried by heterogeneous pilots is not limited to the kind in the above illustrative example. The information can be of any kind that is designed for the proper functioning of the communications system in consideration. For example, in a wireless network with multiple receive-devices, a heterogeneous pilot can carry information that controls which receive-device should decode the primary information-bearing signal.

Figure 5:
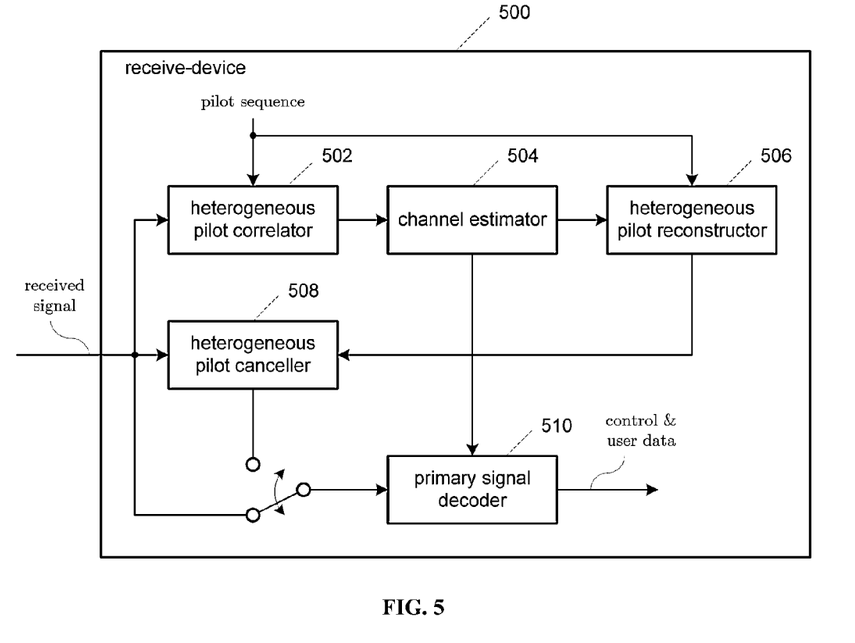
FIG. 5 illustrates an example scheme for heterogeneous pilot cancellation.

According to some more other aspects, a heterogeneous pilot can be cancelled at the receive-device so that its interference to the primary information-bearing signal is minimized or reduced. FIG. 5 illustrates an example scheme for heterogeneous pilot cancellation. Receive-device 500 comprises heterogeneous pilot correlator 502, channel estimator 504, heterogeneous pilot reconstructor 506, heterogeneous pilot canceller 508, and primary signal decoder 510. Heterogeneous pilot correlator 502 correlates the received signal with the pilot sequence. Channel estimator 504 estimates the channel from the correlation results. Heterogeneous pilot reconstructor 506 reconstructs the heterogeneous pilot from the pilot sequence and the estimated channel. Heterogeneous pilot canceller 508 subtracts the reconstructed heterogeneous pilot from the received signal. Ideally, after heterogeneous pilot cancellation, only the primary information-bearing signal from the transmit-device is left, in addition to added noises from the channel. With the knowledge of the estimated channel from channel estimator 504, primary signal decoder 510 decodes the control and user data in the primary information-bearing signal, either from the received signal, which corresponds to no heterogeneous pilot cancellation, or from the output of heterogeneous pilot canceller 508, from which improved decoding performance is expected due to the removal of the interference from the heterogeneous pilot.

It is to be understood that heterogeneous pilot correlator 502 can perform pilot correlation either in time domain or in frequency domain, depending on the signal structures and characteristics of the heterogeneous pilot. It is also to be understood that heterogeneous pilot correlator 502 can use other signal processing means to achieve the same results as the correlation.

Figure 6:
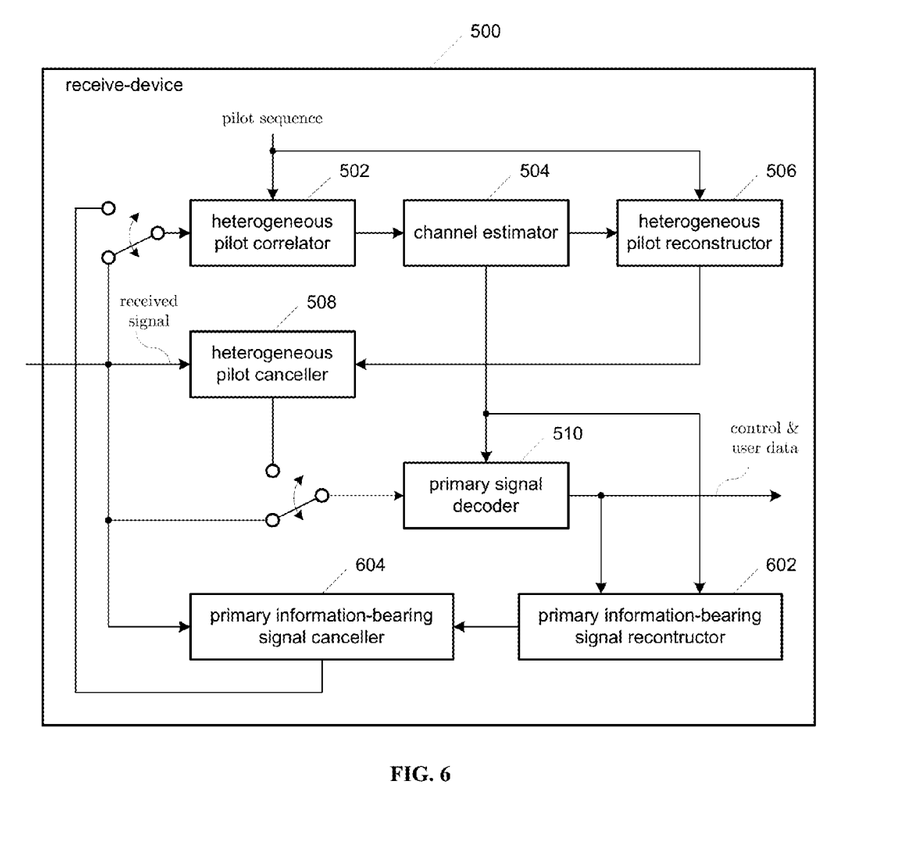
FIG. 6 illustrates an example iterative scheme for heterogeneous pilot cancellation.

The cancellation scheme in FIG. 5 can be used as a basis for iterative cancellation. FIG. 6 illustrates an example iterative scheme for heterogeneous pilot cancellation. In FIG. 6, receive-device 500 further comprises primary information-bearing signal reconstructor 602 and primary information-bearing signal canceller 604. Primary information-bearing signal reconstructor 602 reconstructs the primary information-bearing signal from the output of primary signal decoder 510 and the estimated channel from channel estimator 504. Primary information-bearing signal canceller 604 subtracts the reconstructed primary information-bearing signal from the received signal. Then heterogeneous pilot correlator 502 can redo the correlation between the pilot sequence and the output of primary information-bearing signal canceller 604. If the removal of the primary information-bearing signal by primary information-bearing signal canceller 604 is successful, the output of heterogeneous pilot correlator 502 will be less noisy, and the reconstructed heterogeneous pilot from heterogeneous pilot reconstructor 506 will have higher fidelity, which in turn helps further improve the performance of primary signal decoder 510. The iteration process can be repeated as many times as needed.

It can be appreciated that the principles of heterogeneous pilot cancellation described above apply to a multitude of heterogeneous pilots, as well as to heterogeneous pilots from a multitude of transmit-devices, and to heterogeneous pilots for a multitude of receive-devices. A receive-device can cancel all heterogeneous pilots first, and then decode the primary information-bearing signal or signals. It can also cancel certain heterogeneous pilots first, decode certain primary information-bearing signal or signals, and then continue to work on the remaining heterogeneous pilots and primary information-bearing signals.

Conclusion, Ramifications, and Scope

Accordingly it will be seen that the method of the heterogeneous pilot provides a feasible and efficient means for pilot transmissions in communications networks. With advanced features such as large-dimension MIMO and CoMP to boost the network capacity, more and more pilots are to be added to the RAT signaling. The RAT resources that the traditional homogeneous-pilot approach will have to use will increase to such an extent that the RAT resources for useful data will quickly diminish, thus defeating the purposes of deploying those advanced features altogether. The heterogeneous-pilot approach uses no resources of the RAT of the wireless cellular network, thereby offering a crucial advantage over the resource-choking homogeneous-pilot approach.

An OFDM-based wireless network, such as LTE, can use spread-spectrum heterogeneous pilots. The abundance of orthogonal sequences in spread-spectrum families meets the ever-increasing demand for pilots more than adequately. The heterogeneous pilots can also be made transmit-device specific and/or receive-device-specific to meet the demand of certain advanced features of LTE, such as CoMP.

In addition to providing means for channel estimation, a heterogeneous pilot can also carry information on system configurations and control.

Not only does a heterogeneous pilot have zero resource overhead, its interference to the primary information-bearing signal is also minimal, since the heterogeneous pilot can be effectively cancelled at the receive-device.

It is to be appreciated and understood that the claimed subject matter applies to general communications systems, as well as to wireless networks, including wireless cellular networks and wireless LANs (local-area networks).

While the foregoing disclosure describes illustrative aspects and/or embodiments, it should be noted that various changes and modifications could be made herein by those skilled in the art without departing from the scope of the described aspects and/or embodiments as defined by the appended claims. Furthermore, all or a portion of any aspect and/or embodiment can be utilized with all or a portion of any other aspect and/or embodiment, unless stated otherwise. It is, therefore, to be understood that the appended claims are intended to cover all such modifications, changes, and combinations as fall within the true spirit and the scope of the disclosed subject matter.

What is claimed is:

1. A method for transmitting pilots in a communications network, having at least one transmit-set of transmit-devices and at least one receive-set of receive-devices, each transmit-device in said transmit-set transmitting to said receive-devices in said receive-set, and each receive-device in said receive-set receiving from said transmit-devices in said transmit-set, comprising:
   (a) generating a primary information-bearing signal at each said transmit-device in said transmit-set,
   (b) generating a heterogeneous pilot from a pilot sequence that is known to both said transmit-device and said receive-device at each said transmit-device in said transmit-set, said heterogeneous pilot being one of the following:
      (i) transmit-device specific heterogeneous pilot, and
      (ii) receive-device specific heterogeneous pilot,
      and at least one of generated heterogeneous pilots being said receive-device specific heterogeneous pilot,
   (c) precoding said receive-device specific heterogeneous pilot,
   (d) generating a transmission signal by combining said primary information-bearing signal and said heterogeneous pilot at each said transmit-device in said transmit set, and (e) transmitting said transmission signal from each said transmit-device in said transmit-set to each said receive-device in said receive-set, whereby said heterogeneous pilot does not use resources that carry said primary information-bearing signal, and said receive-device uses said heterogeneous pilot for channel estimation and decodes said primary information-bearing signal according to the estimated channel.

2. The method of claim 1, wherein said communications network is a wireless cellular network, said transmit-set of said transmit-devices is a set of base stations, and said receive-set of said receive-devices is a set of mobile users.

3. The method of claim 1, wherein said heterogeneous pilot is made to carry information, said information being extracted from said heterogeneous pilot and being used by said receive-device to determine how receiver tasks should be carried out, whereby said transmit-device conveys said information to said receive device and said receive-device derives said information conveyed by said transmit-device and uses said heterogeneous pilot for channel estimation.

4. The method of claim 3, wherein the type of said information is system configuration.

5. The method of claim 3, wherein the type of said information is system control.

6. The method of claim 3, further comprising:
(f) assigning more than one said pilot sequences to said heterogeneous pilot, and
(g) choosing one said pilot sequence assigned to said heterogeneous pilot based on said information, to generate said heterogeneous pilot.

7. The method of claim 3, wherein a plurality of said heterogeneous pilots are made to carry single information content.

8. The method of claim 1, further comprising performing heterogeneous pilot cancellation at said receive-device.

9. The method of claim 8, wherein performing heterogeneous pilot cancellation at said receive-device further comprises:
(h) estimating at least one channel from which at least one said heterogeneous pilot is received,
(i) generating at least one reconstructed heterogeneous pilot according to the estimation of said channel, and
(j) generating an updated receive signal by subtracting at least one said reconstructed heterogeneous pilot from the received signal, whereby said receive-device demodulates and decodes said primary information-bearing signal from said updated receive signal.

10. The method of claim 8, wherein heterogeneous pilot cancellation is performed iteratively at said receive-device.

11. The method of claim 1, wherein said communications network is a wireless cellular network with orthogonal frequency-division multi-access (OFDM) based radio access technology (RAT), and said heterogeneous pilot is a spread-spectrum signal.

12. The method of claim 11, wherein said primary information-bearing signal has at least one homogeneous pilot, whereby said receive-device uses both said heterogeneous pilot and said homogeneous pilot for channel estimation and demodulation of said primary information-bearing signal.

13. The method of claim 12, wherein said heterogeneous pilot and said homogeneous pilot overlap in frequency domain.

14. The method of claim 12, wherein said heterogeneous pilot and said homogeneous pilot do not overlap in frequency domain.

* * * * *